April 5, 1932.  C. H. SCHULMAN ET AL  1,852,860
SAFETY DEVICE FOR VEHICLES
Filed Feb. 26, 1931
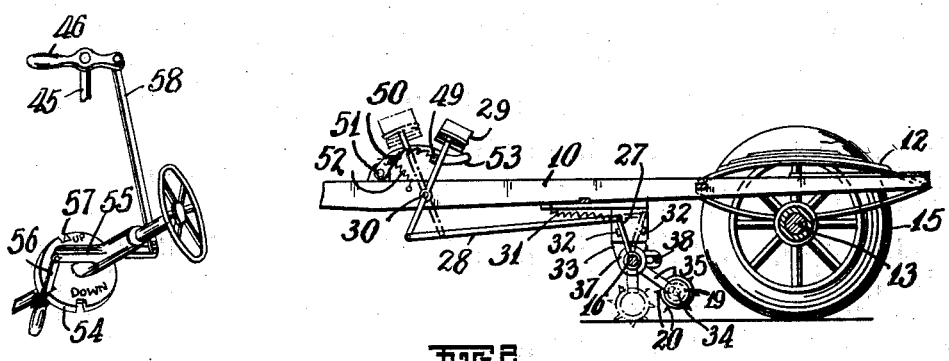
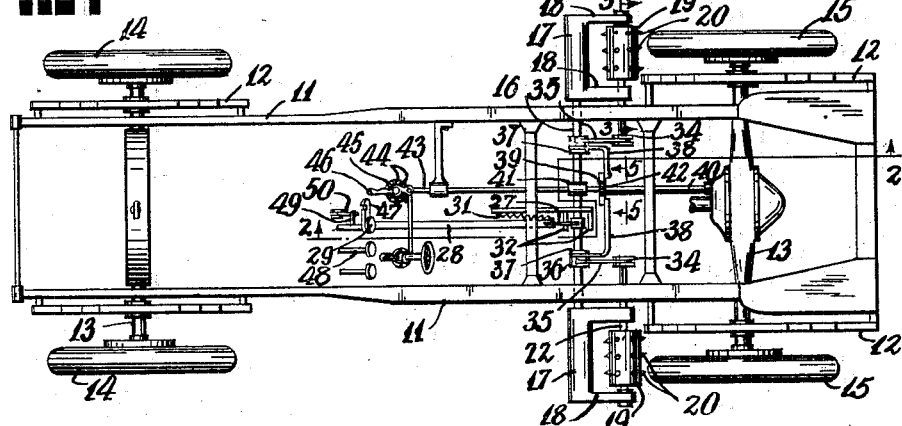
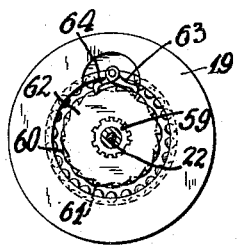
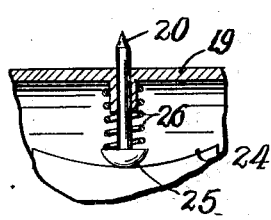
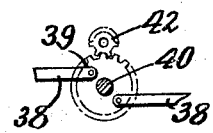
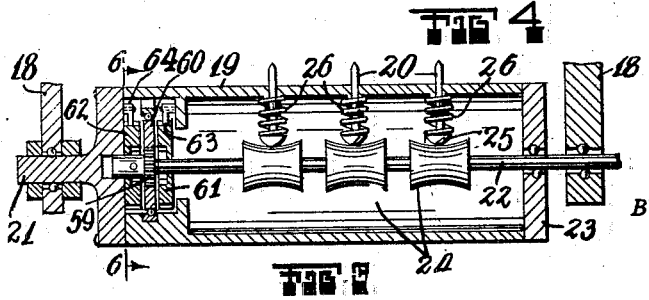
INVENTORS
Charles H. Schulman
Max Cohen
BY
Zoltan H. Polachek
ATTORNEY Patented Apr. 5, 1932

1,852,860

UNITED STATES PATENT OFFICE

CHARLES H. SCHULMAN AND MAX COHEN, OF BROOKLYN, NEW YORK; SAID COHEN ASSIGNOR TO SAID SCHULMAN

SAFETY DEVICE FOR VEHICLES

Application filed February 26, 1931. Serial No. 518,324.

This invention relates to new and useful improvements in an anti-skidding device.

The invention has for an object the construction of an anti-skidding device which is characterized by a roller with pegs arranged for being moved against the ground to the front of the rear wheels of a vehicle and thus prevents skidding.

A still further object of this invention is the provision of a means for moving said roller against the ground controlled by a hand lever in the vicinity of the driver.

As a still further object of this invention it is proposed to provide means for projecting the pegs from said roller to various degrees to suit the road construction upon which the vehicle is passing at the time of skidding.

A still further object of this invention is to arrange the means mentioned in the previous paragraph so as to be operable during the riding of the vehicle from controls in the vicinity of the driver's seat.

And a still further object of this invention is the provision of an anti-skidding device which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of the chassis of a vehicle constructed with an anti-skidding device according to this invention.

Fig. 2 is a fragmentary sectional view taken on the line 2—2 of Fig. 1.

Fig. 3 is a fragmentary enlarged sectional view taken on the line 3—3 of Fig. 1.

Fig. 4 is a fragmentary enlarged detailed view of a portion of Fig. 3.

Fig. 5 is a fragmentary sectional view taken on the line 5—5 of Fig. 1.

Fig. 6 is a transverse sectional view taken on the line 6—6 of Fig. 3. Fig. 7 is a fragmentary perspective view showing the control handles.

Fig. 8 is an enlarged detail view of a portion of Fig. 1.

The anti-skidding device is shown upon the chassis 10 for a vehicle. This chassis, as illustrated, has longitudinal members 11 provided at the ends with customary springs 12 connected with axles 13. The chassis has front wheels 14 and rear wheels 15 upon a rear axle. The remaining details of the vehicle are not illustrated, since it forms no part of this invention and would be readily understood.

A transverse shaft 16 is shown rotative through the chassis 10 and parallel with the rear axle 13. The ends of this shaft project outside of the chassis and support roller brackets 17 in planes containing the rear wheels 15. The brackets 17 each have spaced fingers 18 and rollers 19 which extendible pegs 20 are arranged between the fingers 18 for acting against the ground to the front of the rear wheels 15.

Each of the rollers 19 is in the form of a hollow drum, as illustrated in Fig. 3, having a trunnion 21 rotatively engaged within one of the fingers 18. A rod 22 rotatively engages in the other finger 18 and extends into the drum through an end disc 23 on the drum. This rod is formed with a plurality of conical portions 24 for extending the pegs 20 as hereinafter further described. The pegs 20 are slidably arranged radially within the drum of the roller and have their inner ends provided with heads 25 acting against the conical portions 24 of the rod. It should be noticed that as the rod 22 is moved axially, the conical portions 24 will serve to move the heads 25 outwards or inwards depending upon the position of the rod 22. Coaxial springs 26 are arranged upon each of the pegs 20 and act between the interior of the drum of the roller and the heads 25 for maintaining the contact of the heads of the conical members.

A means is provided for turning the shaft 16 for lowering the rollers 19 against the ground. This means is in the form of a radial arm 27 fixed upon the shaft 16 and connecting with a link 28 attached at its other end upon the bottom end of a pivoted foot lever 29. The foot lever is pivoted upon the chassis at the point 30. A means may also be provided for operating the foot lever 29 selectively or simultaneously with the foot brake of the vehicle. The means consists of a lever member 47 adjustably mounted upon the pedal 29 and capable of assuming an inoperative position as shown in Fig. 1 or a position in which it engages the foot brake 48 of the vehicle. When engaged with the foot brake it will function upon operation of the latter element. When it is not connected it is necessary that the pedal 29 be operated to lower the rollers 19 against the ground. Further, a means is provided to hold the rollers 19 in various lowered positions and comprises a finger 49 projecting from the pedal 29 and engageable against the teeth of a rack 50 which is pivotally mounted at 51 and urged against the finger by a spring 52. This rack has a front end 53 which may be raised by the operator's foot to disengage the pedal 29 and allow the spring 31 to move it back into the inoperative position. A spring 31 acts between the link 28 and the chassis 10 for normally turning the shaft 16 in a position in which the rollers are off the ground. Stops 32 project from a support bracket 33 attached upon the chassis 10 so as to limit the amplitude of motion of the radial arm 27 to positions in which the rollers are against the ground or raised as shown in Fig. 2.

A means is also provided for extending the pegs 20 when desired to meet the different conditions of different roads. This means is in the form of a collar 34 attached upon each of the rods 22 and engaged by a fork 35 longitudinally slidable and rotatable on the shaft 16. The fork 35 has a hub portion 36 which is formed with a collar 37 engaged by another form 38 connecting eccentrically with a gear 39 fixed upon a shaft 40 rotatively supported between the rear axle 13 and a standard 41 arranged on the shaft 16.

A pinion 42 meshes with the gear 39 and is fixed upon a rod 43 rotatively mounted and extended to the vicinity of the driver's seat. At this point a bevel gear system 44 connects with the rod and with a vertical rod 45 extended upwards to the vicinity of the driver of the vehicle and terminating in a handle 46 for manual turning.

The handle 46 may be turned to a position so that the pegs 20 are normally extended a desired amount to suit the average road over which the vehicle is traveling. If the driver encounters continual skidding on the road and recognizes that the pegs should be further extended or retracted according to the damage on the road or other controlling conditions, he need merely move the handle 46 to cause the gear 39 to slightly turn and draw the forks 38 towards each other or away from each other. As the forks 39 move, the hubs 36 will be moved correspondingly and move the forks 35 which move the rods 22 inwards or outwards. A change in the position of the rods causes the pegs 20 to assume different positions.

Normally the rollers 19 are out of contact with the ground as illustrated in Fig. 2. To stop a skid, the operator need only move the foot lever 29 forwards so that the radial arm 27 moves rearwards and causes slight turning of the shaft 16 to lower the brackets 17 so that the rollers engage against the ground and the operator raises the member 53. When the skid is over, the spring 31 will cause the parts to assume their initial positions with the rollers disengaged.

In all positions of the rollers 19, that is, either the raised or the lowered position, the pegs 20 may be extended since the fork 35 swings on the shaft 16 which is the same point of swinging of the roller brackets 17.

Normally, the rollers 19 are free to rotate. A means is also provided for restraining the rollers from rotating in one or in the other direction as is desired. This is of extreme advantage when the vehicle travels either up or down a hill. This will prevent the vehicle from rolling and causing strains upon the motor. Further, it may serve to lock the vehicle against forward motion also as a safety device against stealing the vehicle.

The means referred to in the previous paragraph comprises a stationary disc 54 fixed upon the steering column of the vehicle and a bracket 55 rotative on the steering column. A latch lever 56 is pivotally connected on the bracket 55 and is individually engageable with one or in another of a plurality of niches 57 found in the disc 54. The bracket 55 also is connected by a link 58 with the handle 46 so as to move the handle to cause operation of the means which extends the pegs 20.

A gear 59 is fixed upon the shaft 22 and normally engages in a rotatively mounted disc 60 within the rollers 19. The shaft 22 may be moved laterally through small distances so as to cause the projection or retraction of the pegs 20. The shaft 22 may be moved extremely far in either direction so as to engage in a ratchet wheel 61 or in the second ratchet wheel 62. The ratchet wheel 61 has its teeth directed one way and is engaged by a pawl 63 carried on the roller 19. A second pawl 64, also carried by the roller 19 is engageable with the second ratchet wheel 62. This latter ratchet wheel has its teeth directed in the opposite direction to the teeth of the ratchet wheel 61. The proportion of the parts is such that when the latch lever 56 is placed in the cutout 57 at the extreme left of the disc 54, then the rollers 19 are restrained from rotating rearwards, and when in the cutout 57 at the extreme right of the disc 54, the roller 19 is restrained from rotating in the opposite direction.

The rollers 19 and their operating mechanism will be so located as not to interfere with the fender and the other present equipment of the motor vehicle.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. In combination with a vehicle having a rear axle and wheels, of a transverse shaft rotative in said vehicle and parallel to said axle, roller brackets fixed on the ends of said shaft, rollers with extendable pegs on said brackets for engaging the ground to the front of said rear wheels, means for turning said shaft for lowering said rollers, and means for extending said pegs, comprising rods slidable within said rollers and formed with conical portions engaging the inner ends of the extendable pegs, and means for moving said rods into various fixed longitudinal positions.

2. In combination with a vehicle having a rear axle and wheels, of a transverse shaft rotative in said vehicle and parallel to said axle, roller brackets fixed on the ends of said shaft, rollers with extendable pegs on said brackets for engaging the ground to the front of said rear wheels, means for turning said shaft for lowering said rollers, and means for extending said pegs, comprising rods slidable within said rollers and formed with conical portions engaging the inner ends of the extendable pegs, and means for moving said rods into various fixed longitudinal positions, comprising collars on said rods engaged by forks having hub portions slidable and rotatable upon said shaft, other forks engaging said hub portions and connected eccentrically on a rotative member, and means for turning said rotative member to various positions.

3. In combination with a vehicle having a rear axle and wheels, of a transverse shaft rotative in said vehicle and parallel to said axle, roller brackets fixed on the ends of said shaft, rollers with extendible pegs on said brackets for engaging the ground to the front of said rear wheels, means for turning said shaft for lowering said rollers, and means for extending said pegs, comprising rods slidable within said rollers and formed with conical portions engaging the inner ends of the extendible pegs, and means for moving said rods into various fixed longitudinal positions, comprising collars on said rods engaged by forks having hub portions slidable and rotatable upon said shaft, other forks engaging said hub portions and connected eccentrically on a rotative member, and means for turning said rotative member to various positions, comprising a bevel gear meshing with teeth on the rotative member and connected with a transmission system terminating in a hand lever in the vicinity of the driver of the vehicle.

4. In combination with a vehicle having a rear axle and wheels, of a transverse shaft rotative in said vehicle and parallel to said axle, roller brackets fixed on the ends of said shaft, rollers with extendible pegs on said brackets for engaging the ground to the front of said rear wheels, means for turning said shaft for lowering said rollers, means for extending said pegs, and means for preventing rotation of said rollers in one or the other direction.

5. In combination with a vehicle having a rear axle and wheels, of a transverse shaft rotative in said vehicle and parallel to said axle, roller brackets fixed on the ends of said shaft, rollers with extendible pegs on said brackets for engaging the ground to the front of said rear wheels, means for turning said shaft for lowering said rollers, means for extending said pegs, and means for preventing rotation of said rollers in one or the other direction, comprising a rod slidably mounted with each of the rollers, two wheels rotatively mounted on said rod, means for connecting said roller with one of the said wheels when the roller rotates in one direction, means for connecting said roller with the other of the said wheels when the roller rotates in the other direction, and means for selectively fixing the said wheels to the rod.

6. In combination with a vehicle having a rear axle and wheels, of a transverse shaft rotative in said vehicle and parallel to said axle, roller brackets fixed on the ends of said shaft, rollers with extendible pegs on said brackets for engaging the ground to the front of said rear wheels, means for turning said shaft for lowering said rollers, means for extending said pegs, and means for preventing rotation of said rollers in one or the other direction, comprising a rod slidably mounted with each of the rollers, two wheels rotatively mounted on said rod, means for connecting said roller with one of the said wheels when the roller rotates in one direction, means for connecting said roller with the other of the said wheels when the roller rotates in the other direction, and means for selectively fixing the said wheels to the rod, comprising a gear fixed upon said rod and engageable with said wheels.

7. In combination with a vehicle having a rear axle and wheels, of a transverse shaft rotative in said vehicle and parallel to said axle, roller brackets fixed on the ends of said shaft, rollers with extendible pegs on said brackets for engaging the ground to the front of said rear wheels, means for turning said shaft for lowering said rollers, means for extending said pegs, and means for preventing rotation of said rollers in one or the other direction, comprising a rod slidably mounted with each of the rollers, two wheels rotatively mounted on said rod, means for connecting said roller with one of the said wheels when the roller rotates in one direction, means for connecting said roller with the other of the said wheels when the roller rotates in the other direction, and means for selectively fixing the said wheels to the rod, said means for connecting the roller with the said wheels comprises ratchet teeth formed upon said wheels, and spring pressed pawls engaging said teeth.

In testimony whereof we have affixed our signatures.

CHARLES H. SCHULMAN.
MAX COHEN.